Patented Feb. 6, 1951

2,540,681

UNITED STATES PATENT OFFICE 2,540,681

PREPARATION OF STEROID ALCOHOLS

Robert H. Levin, A. Vern McIntosh, Jr., and George B. Spero, Kalamazoo, Mich., assignors to The Upjohn Company, Kalamazoo, Mich., a corporation of Michigan No Drawing. Application October 2, 1947, Serial No. 777,576

12 Claims. (Cl. 260—397.5)

The present invention relates to steroid primary alcohols and to a method for the production thereof. The invention is more specifically concerned with certain steroid alcohols of the formula:

$$P-(CH_2)_n-CH_2OH$$

wherein P represents a pregnane nucleus attached to the side-chain at the 20 position, and $n$ is selected from zero, one, and two, and with a method for the preparation thereof from steroid thioesters of the formula:

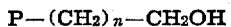

wherein P and $n$ have the values given for the desired alcohol and R is a thioalcohol residue.

It is an object of the present invention to provide novel primary steroid alcohols containing the pregnane nucleus and having a side-chain at the 20 position. These novel alcohols, containing acyloxy groups in the pregnane nucleus, have been unobtainable previously, as previous methods of alcohol preparation have involved the concomitant saponification or hydrolysis of the nuclear acyloxy groups. A further object of the invention is the provision of a process for the production of the said alcohols from thioesters having a side-chain containing the same number of carbon atoms. Other objects of the invention will become apparent hereinafter.

Members of the new group of compounds have been prepared, isolated, and found to be valuable intermediates in the preparation of more complex organic molecules, including certain hormones.

Among the thio esters which may be employed as suitable starting materials for the preparation of the steroid alcohols are thioester derivatives of steroid acids, e. g., cholanic acid, of the formula:

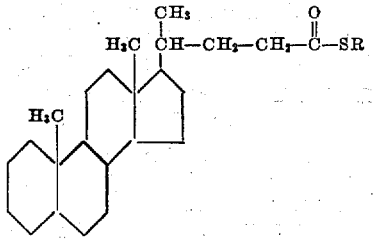

thioester derivatives of cholenic acid, of the formula:

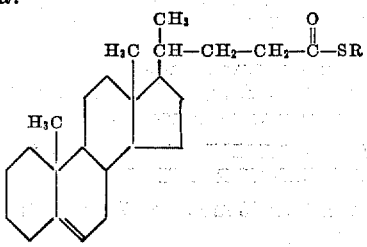

thioesters of lithocholic acid, of the formula:

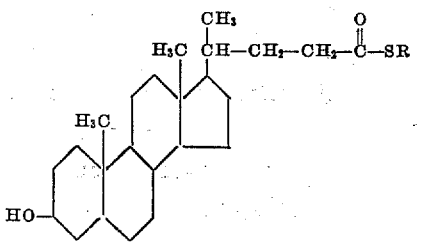

thioesters of desoxycholic acid, of the formula:

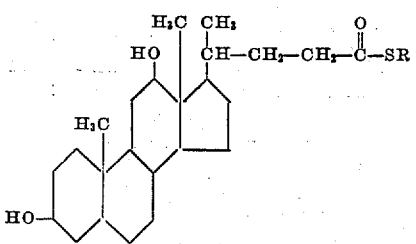

thioesters of cholic acid, of the formula:

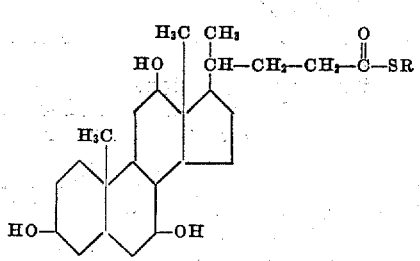

and thioesters of tetrahydroxycholanic acid, of the formula:

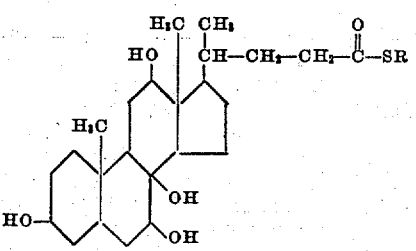

wherein R is an alcohol residue. Likewise, other thioesters of unsaturated bile acids, such as 3-hydroxy-(delta 5)-cholenic, 3,11-dihydroxy-(delta 5)-cholenic, and 3-hydroxy-(delta 5,7)-choladienic acids, are suitable starting materials. Other suitable thioesters are those having one less side-chain carbon atom, i. e., the thioesters of nor-cholanic acids, and related compounds having substituents as given above in the cholenic series. The nor-cholanic series has the general structure:

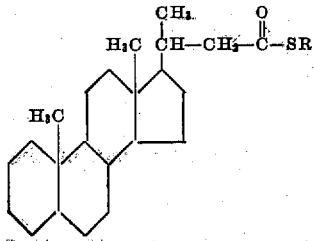

The thioesters of bisnor-cholanic acids have two less carbon atoms in the side-chain, e. g.:

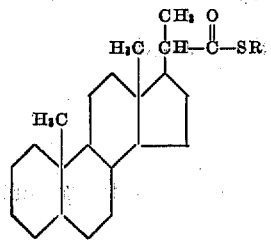

and these compounds are also suitable starting materials.

Thioesters having the designated side-chains and additional substituents in the nucleus, such as hydroxyl groups, esters and ether derivatives of hydroxyl groups, double bonds, protected double bonds, e. g., as by conversion to the dihalide or hydrohalide, and halogen atoms may also be used as starting materials. Some compounds having the mentioned substituents have been indicated for the first series, but any compound having the prescribed pregnane nucleus and the specified C-20

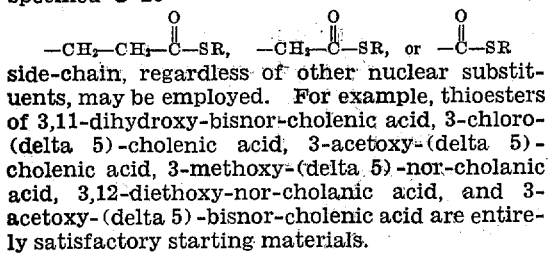

side-chain, regardless of other nuclear substituents, may be employed. For example, thioesters of 3,11-dihydroxy-bisnor-cholenic acid, 3-chloro-(delta 5)-cholenic acid, 3-acetoxy-(delta 5)-cholenic acid, 3-methoxy-(delta 5)-nor-cholanic acid, 3,12-diethoxy-nor-cholanic acid, and 3-acetoxy-(delta 5)-bisnor-cholenic acid are entirely satisfactory starting materials.

A selected steroid acid may be converted to the corresponding thioester by either of two procedures, both of which proceed through the acid chloride. The first (A) involves reaction of the acid halide e. g., bromide or chloride, with a mercaptan in pyridine, and the second (B) involves reaction of the acid chloride with a suspension of lead mercaptide in ether, according to the following sequence, as illustrated for an unsubstituted acid:

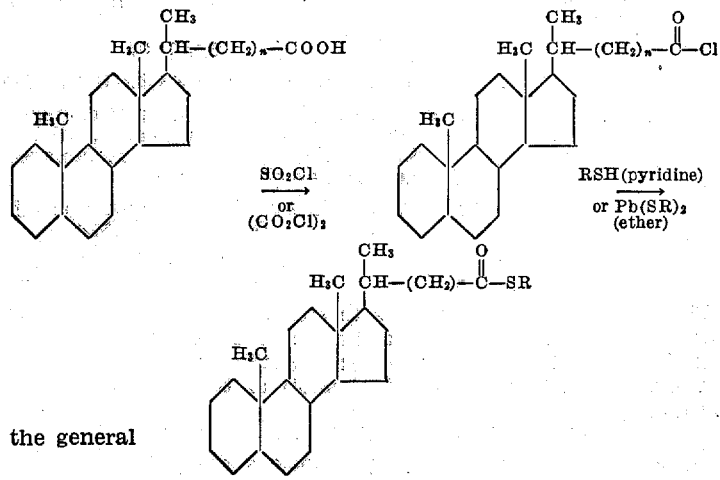

wherein: $n$ is zero, one, or two; and R is an alcohol residue, preferably a hydrocarbon radical. Both of the given procedures have proven suitable.

Choice of the R radical in the starting thioester is purely arbitrary, the availability of the mercaptan or lead mercaptide being the only limiting factor. R may thus be alkyl, e. g., methyl, ethyl, propyl, isopropyl, butyl, isobutyl, amyl, n-octyl, or the like; cycloalkyl, e. g., cyclopentyl, cyclohexyl; cycloalkylalkyl, e. g., cyclohexylmethyl; aryl, e. g., phenyl, naphthyl; or aralkyl, e. g., benzyl or phenethyl. Unsaturated aliphatics and cycloaliphtics, or compounds where R may also be chloroethyl, nitrophenyl, aminopropyl, bromonaphthyl and the like, are likewise suitable.

PROCEDURE A.—MERCAPTAN IN PYRIDINE

The acid chloride, usually in an organic solvent, such as anhydrous benzene, is admixed with a selected mercaptan in a pyridine solution. Equimolar proportions are satisfactory, but an excess of mercaptan may sometimes be employed to advantage. Gentle heating sometimes increases reaction rate, but is not usually necessary, as the reaction occurs readily at room temperature. The reaction product may be worked up with water and ether, aqueous portions extracted and the combined ether layer washed with water, dilute alkali, dilute acid, and again with water. After drying the neutral fraction and evaporating solvent, the residual oil may be crystallized from a suitable solvent, e. g., alcohol, to yield the desired thioester, usually a stable solid.

PROCEDURE B.—LEAD MERCAPTIDE IN ETHER

The acid chloride in anhydrous ether is added to a mixture of ether and selected lead mercaptide, or vice versa. Equimolar proportions are satisfactory; other ratios may be used if desired. The reaction mixture is allowed to stand with occasional swirling, gentle heating if desired. The reaction product may be worked up as in Procedure A.

The following examples are given to illustrate the preparation of a suitable starting thioester, but are in no way to be construed as limiting.

EXAMPLE 1.—BENZYL 3-ALPHA,12-ALPHA-DIACETOXY-NOR-THIOCHOLANATE

To 1.5 grams (0.0033 mole) of 3-alpha,12-alphadiacetoxy-nor-cholanic acid was added 6 milliliters (9.8 grams, 0.082 mole) of purified thionyl chloride (Fieser, Experiments in Organic Chemistry, Part II, Heath and Co., New York, 1941, p. 381). The acid dissolved within five minutes and the solution was allowed to stand, with occasional swirling, at room temperature for one hour. Twenty milliliters of a 1:1 mixture of anhydrous benzene and ether was then added and the whole evaporated to dryness in vacuo at 40 degrees centigrade. This process of treatment with benzene-ether was repeated twice to ensure complete removal of excess thionyl chloride.

To the resulting acid chloride dissolved in 10 milliliters of anhydrous benzene was added 0.4 milliliter (0.005 mole) of dry pyridine and 2 milliliters (1.12 grams, 0.009 mole) of benzyl mercaptan, a precipitate soon forming. After standing for twenty-four hours at room temperature, the mixture was diluted with 15 milliliters of water and 15 milliliters of ether, whereafter the precipitate dissolved and the ether-benzene phase was separated. The aqueous portion was extracted with two 15-milliliter portions of ether, and the combined ether-benzene layer was washed with 30 milliliter portions of water, one per cent sodium hydroxide, one per cent hydrochloric acid, and finally again with water. The neutral fraction was dried over anhydrous sodium sulfate, the solvent evaporated to dryness in vacuo, and the residual oil crystallized from 50 milliliters of 95 per cent alcohol to give 1.38 grams (73 per cent) of product, M. P. 147-152 degrees centigrade. After three recrystallizations from alcohol, 123 grams (65.5 per cent) of the benzyl thio ester with a constant melting point of 154-156 degrees centigrade (corr.) was obtained.

EXAMPLE 2.—ETHYL 3-ALPHA,12-ALPHA-DI-FORMOXY-THIOCHOLANATE

The acid chloride (prepared from 4.5 grams (0.01 mole) of 3-alpha,12-alpha-diformyl-desoxycholic acid in the manner described in Example 1) was dissolved in 30 milliliters of anhydrous ether and added to 1.8 grams (0.0055 mole) of lead ethyl mercaptide covered with 20 milliliters of anhydrous ether. The mixture was allowed to stand at room temperature with occasional swirling, the yellow lead mercaptide being gradually replaced by white lead chloride. After twenty-four hours, the solution was filtered and the precipitate washed with 50 milliliters of ether. The combined ether filtrate was washed with 100 milliliters of one per cent sodium hydroxide and 300 milliliters of water, then dried over anhydrous sodium sulfate and evaporated to dryness in vacuo on the steam bath. The residual oil was dissolved in 50 milliliters of hot alcohol and 10 milliliters of water added. On cooling, an oil separated, taking with it all the color in the solution; after which crystallization yielded 2.2 grams of material. An additional 0.32 gram of crystals was obtained by crystallizing the oil from alcohol, the total yield being 2.52 grams (51 per cent of the theoretical), M. P. 105-110 degrees centigrade. After three recrystallizations, the melting point was constant at 111-112 degrees centigrade (corr.).

Other suitable thioesters which may be employed as starting materials in the method of the present invention are given in the table.

Table.—Esters of steroid acids

| Compound | M. P., °C.[1] | Rotation[2] (alpha)$_D$ | Molecular Formula | Analyses, Per Cent | | | | | |
|---|---|---|---|---|---|---|---|---|---|
| | | | | Carbon | | Hydrogen | | Sulfur | |
| | | | | Calcd. | Found | Calcd. | Found | Calcd. | Found |
| ethyl 3-beta-hydroxy-(delta 5)-thiocholenate | 108.5-109.5 | −38.5 | $C_{26}H_{42}O_2S$ | 74.59 | 74.64 | 10.00 | 10.07 | 7.66 | 7.79 |
| ethyl 3-beta-formoxy-(delta 5)-thiocholenate | 81-82 | −47.5 | $C_{27}H_{42}O_4S$ | 72.60 | 72.07 | 9.48 | 9.61 | 7.18 | 7.01 |
| ethyl 3-beta-acetoxy-(delta 5)-thiocholenate | 101.5-103.5 | −40.9 | $C_{28}H_{44}O_3S$ | 72.99 | 72.92 | 9.63 | 9.69 | 6.98 | 7.36 |
| isopropyl 3-beta-acetoxy-(delta 5)-thiocholenate | 131-133 | −40.4 | $C_{29}H_{48}O_3S$ | 73.37 | 73.39 | 9.77 | 9.55 | 6.75 | 6.81 |
| tert-butyl 3-beta-acetoxy-(delta 5)-thiocholenate | 169.5-171 | −39.8 | $C_{30}H_{48}O_3S$ | 73.42 | 74.07 | 9.90 | 9.96 | 6.56 | 6.71 |
| n-hexyl-3-beta-acetoxy-(delta 5)-thiocholenate | 77.5-79.5 | −35.4 | $C_{32}H_{52}O_3S$ | 74.37 | 74.70 | 10.14 | 10.00 | 6.20 | 6.60 |
| ethyl-3-chloro-(delta 5)-thiocholenate | 103.5-105 | −30.4 | $C_{26}H_{41}OSCl$ | 71.44 | 71.51 | 9.46 | 9.58 | 8.11 | [4]8.75 |
| ethyl-3-beta-acetoxy-5-chloro-nor-thiocholanate | 165-168 | | $C_{28}H_{45}O_2SCl$ | | | | | 6.45 | 6.32 |
| ethyl 3-beta-acetoxy-(delta 5)-bisnor-thio cholenate | 132-133 | −38.0 | $C_{28}H_{40}O_3S$ | 72.18 | 72.50 | 9.32 | 9.13 | 7.41 | 7.44 |
| ethyl 3-alpha,12-diformoxy - thiocholanate | 111-112 | +92.1 | $C_{28}H_{44}O_5S$ | 68.25 | 68.39 | 9.00 | 8.89 | 6.51 | 6.51 |
| ethyl 3-alpha-formoxy thiocholanate | 81-82 | +41.3 | $C_{27}H_{44}O_3S$ | 72.27 | 72.53 | 9.89 | 9.74 | 7.14 | 7.23 |
| ethyl 3-alpha,12-diacetoxy-nor-thiocholanate | 91-91.5 | +96.0 | $C_{29}H_{46}O_5S$ | 68.76 | 69.07 | 9.15 | 9.47 | 6.33 | 6.37 |
| benzyl 3-alpha,12-alpha-diacetoxy-nor-thiocholanate | 154-156 | +95.5 | $C_{34}H_{48}O_5S$ | 71.79 | 71.56 | 8.51 | 8.79 | 5.64 | 5.66 |
| phenyl 3-alpha,12-alpha diacetoxy-nor-thiocholanate | 146-147 | +99.7 | $C_{33}H_{46}O_5S$ | 71.44 | 71.30 | 8.36 | 8.04 | 5.78 | 5.64 |
| phenyl 3-beta-acetoxy-(delta 5)-thiocholenate | 128.5-130 | | | 75.40 | 75.11 | 8.90 | 8.59 | 6.29 | 6.89 |
| benzyl 3-beta-acetoxy-(delta 5)-thiocholenate | 85-86.5 | | | 75.67 | 75.77 | 9.05 | 8.72 | | |
| ethyl 3-alpha,7-alpha,12-alpha-triformoxythiocholanate | c. 128 | | | 64.77 | 65.78 | 8.44 | 8.07 | | |
| ethyl 3-alpha-hydroxy-12-alpha-acetoxythiocholanate | | | | | | 9.54 | 9.34 | | |
| ethyl 3-methoxy-(delta 5)-bisnor-thiocholenate | 94-96 | | | | | | | | |
| ethyl 3-benzoyloxy-(delta 5)-thiocholenate | 178-182 | | | | | | | | |
| ethyl thiodehydrocholate | 244-246.5 | | | | | | | | |

[1] All M. P.'s corrected.
[2] Rotations taken at approximately 25° C. in chloroform with a 1 cm. tube.
[3] Desoxycholic acid is formulated as 3-alpha,12-alpha, according to the latest evidence (Ann. Rev. Biochem. 15, 162 (1946)).
[4] Chlorine analysis.

Desulfurization and reduction of the selected thioester to an alcohol of the formula:

$$P\text{-}(CH_2)_n\text{-}CH_2OH$$

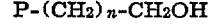

wherein P and $n$ have the values previously assigned, may be carried out with any suitable Raney-type hydrogenation catalyst. Among the Raney-type catalysts which may be mentioned are Raney nickel and Raney iron. Superactivated catalysts are available, and employment of such catalysts of enhanced activity is sometimes advantageous. An organic solvent, such as ether, alcohol, benzene, toluene, or ethyl acetate is suitable. The reaction is conducted by admixing the reactants in the presence of a solvent, and temperatures between about zero and about 120 degrees centigrade are preferred. The product may be removed from the reaction vessel after completion of the reaction, separated from Raney-type catalyst, and then worked up for purification and separation purposes as desired, usually by direct crystallization from the solvent employed.

The following examples are given to illustrate the preparation of the primary alcohols from the thioesters, but are in no way to be construed as limiting.

EXAMPLE 3.—3 - ALPHA - FORMOXY - 24 - HYDROXYCHOLANE

A suspension of 6 grams of Raney nickel (Wisconsin) in a solution of 0.50 gram of the ethyl thioester of 3-formyl-lithocolic acid in 25 milliliters of absolute alcohol was stirred at room temperature for three hours. The Raney nickel was separated by filtration, washed with alcohol, the filtrate reduced in volume to 20–30 milliliters and diluted with several volumes of water. The yield of 3-alpha-formoxy-24-hydroxy cholane was 0.42 gram; M. P. 81.5–83 degrees centigrade after several recrystallizations from 95% alcohol and water. Alpha $_D^{25}=+30.0$ degrees.

EXAMPLE 4.—3 - BETA - ACETOXY - 22 - HYDROXY - (DELTA 5) - BISNOR - CHOLENE

This compound was prepared from 0.6 gram of ethyl 3-beta-acetoxy-(delta 5)-bisnor-thiocholanate and 9 grams of Raney nickel (Wisconsin) in 15 milliliters of absolute alcohol in the same manner as given for Example 3. After purification by chromatography and recrystallization from 95% alcohol and water, 231 milligrams, M. P. 152–153.5 degrees centigrade, were obtained.

EXAMPLE 5.—3 - BETA - ACETOXY - 24 - HYDROXY - (DELTA 5) - CHOLENE

This compound was prepared from ethyl 3-beta-acetoxy-(delta 5)-thiocholanate and found to melt at 143.5–146 degress centigrade.

EXAMPLE 6.—3 - ALPHA,12 - ALPHA - DIACETOXY - 23 - HYDROXY - NOR - CHOLANE

This compound was prepared from 3.0 grams of ethyl 3,12-diacetoxy-thio-nor-cholanate in a mixture of 200 milliliters of absolute alcohol and 52 milliliters of water, divided into ten equal portions, which were passed through a column of 10 grams of Pavlic Raney nickel. The yield of desired product was 93 per cent; M. P. 148.5–151 degrees centigrade, Alpha $_D^{26}=+110$ degrees.

EXAMPLE 7.—3 - BETA,24 - DIHYDROXY - (DELTA 5) - CHOLENE

This compound was prepared from 500 milligrams of ethyl 3-beta-hydroxy-(delta 5)-thiocholanate and 6 grams of Pavlic Raney nickel at room temperature in 10 milliliters of absolute alcohol. The yield was 261 milligrams; M. P. 196–199 degrees centigrade.

EXAMPLE 8.—3 - ALPHA,24 - DIHYDROXY - 12-ALPHA-FORMOXY-CHOLANE

This compound was prepared from ethyl 3-alpha, 12-alpha-diformoxy-thiocholanate (2.0 grams) and 10 grams of Raney-Wisconsin nickel catalyst in 10 milliliters of alcohol and 10 milliliters of water. The product was allowed to stand for a short period of time to allow hydrolysis of the 3-formoxy group to a hydroxy group, and the desired 3-alpha,24-dihydroxy-12-alpha-formoxy-cholane (0.47 gram, M. P. 185–186.5 degrees centigrade) separated therefrom.

EXAMPLE 9.—3 - ALPHA,23 - DIHYDROXY-12-ALPHA - ACETOXY-NOR-CHOLANE

This compound was prepared from ethyl 3-alpha - hydroxy - 12 - alpha - acetoxy - nor - thiocholanate (1.8 grams) and 20 grams of Pavlic Raney nickel in 60 milliliters of alcohol and 15 milliliters of water. The mixture was refluxed 2 hours, then cooled, filtered, and the product worked up as described in Example 3. The yield of desired product was 0.92 gram; M. P. 172–174 degrees centigrade.

An advantage of the process as previously outlined is the possibility of reductively desulfurizing a thioester, having the selected side-chain length, to a primary alcohol of corresponding side-chain length, without converting nuclear acyloxy groups to hydroxy groups. For example, starting with a 3,12-diacyloxy pregnane derivative of designated side-chain length, the reductive desulfurization converts the thioester group to a primary alcohol group without affecting the acyloxy groups. However, when one or both acyloxy groups are formoxy, prolongation of the reaction period may be employed, if desired, to obtain conversion of the formoxy group at position 3 to a hydroxy group. The conversion of the 3-formoxy group to hydroxy may be caused to occur by extending the reaction period or by employing more strenuous reaction conditions. The conversion takes place under such conditions, regardless of the acyloxy group at the 12 carbon atom, which in every case appears to be more stable. This is an important observation, allowing variation of the nuclear acyloxy groups, as the 3-hydroxyl may be acylated with a different group to produce a compound with unlike acyloxy groups in the 3 and 12 positions.

Representative alcohols which may be prepared from the corresponding thioesters by reduction with Raney nickel are as follows:

| Alcohols | M. P. °C. |
|---|---|
| 3-alpha-formoxy-24-hydroxycholane | 81. 5–83 |
| 3-alpha-24-dihydroxy-12-formoxy-cholane | 185–186. 5 |
| 3-alpha-12-alpha-diacetoxy-23-hydroxy-nor-cholane | 154–155 |
| 3,12-dibenzoyloxy-24-hydroxy-cholane |  |
| 3-beta-acetoxy-24-hydroxy-(delta 5)-cholene | 143–146 |
| 3-beta-24-dihydroxy-(delta 5)- cholene | 196–199 |
| 3-alpha-23-dihydroxy-12-alpha-acetoxy-nor-cholane | 172–174 |
| 3-alpha-12-diacetoxy-23-hydroxy-nor-cholene | 148. 5–151 |
| 3-beta-acetoxy-22-hydroxy-(delta 5)-bisnor-cholene | 152–153. 5 |
| 3-beta-benzoxy-24-hydroxy-(delta 5)- cholene | 182–184 |

The acyloxy groups may be varied widely, and may be, for example, propionoxy, butyroxy, benzoyloxy, and the like, depending upon the starting thioester.

Various modifications may be made in the present invention without departing from the spirit or scope thereof, and it is to be understood that we limit ourselves only as defined in the appended claims.

We claim:

1. The process which includes: converting a compound of the formula:

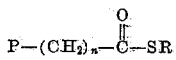

wherein P represents a nucleus, selected from the group consisting of pregnane, pregnene, and pregnadiene nuclei, which is attached to the side-chain in the 20 position; $n$ is selected from zero, one, and two, and R is a thio-alcohol residue; to a compound of the formula:

$$P-(CH_2)_n-CH_2OH$$

wherein P and $n$ have the previously assigned values, by mixing the thioester together with a Raney-type catalyst at a temperature between about zero and 120 degrees centigrade.

2. The process of claim 1, wherein the conversion is with Raney nickel in the presence of an organic solvent.

3. A compound of the formula:

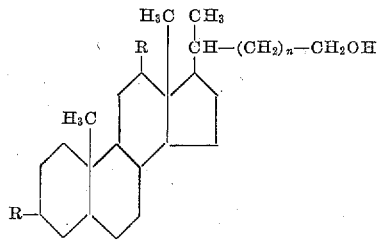

wherein $n$ is selected from zero, one, and two, and R is selected from hydroxy and R'COO—, wherein R' is selected from the group consisting of hydrogen and lower-alkyl, at least one R being R'COO.

4. 3,12-diacetoxy-23-hydroxy-nor-cholane.
5. 3,23-dihydroxy-12-acetoxy-nor-cholane.
6. 3,24-dihydroxy-12-formoxy-cholane.
7. The process which includes: mixing a compound of the formula:

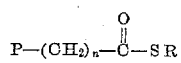

wherein P represents a nucleus, selected from the group consisting of pregnane, pregnene, and pregnadiene nuclei, having the side-chain attached in the 20 position; $n$ is selected from zero, one, and two; and R is a thioalcohol residue; with a Raney-type catalyst, in an organic solvent at a temperature between about zero and 120 degrees centigrade; and separating a steroid alcohol of the formula $$P-(CH_2)_n-CH_2OH,$$

wherein P and $n$ have the previously assigned values, from the reaction product.

8. The process of claim 7, wherein the Raney-type catalyst is Raney nickel.
9. The process of claim 7, wherein the starting compound is a thiocholanate.
10. The process of claim 7, wherein the starting compound is a (delta 5)-thiocholenate.
11. The process of claim 7, wherein the starting compound is a thio-nor-cholanate.
12. The process of claim 7, wherein the starting compound is a 3-formoxy-12-acyloxy-thiocholanate and the steriod alcohol separated from the reaction product is a 3,24-dihydroxy-12-acyloxy-cholane.

ROBERT H. LEVIN.
A. VERN McINTOSH, JR.
GEORGE B. SPERO.

REFERENCES CITED

The following references are of record in the file of this patent:

UNITED STATES PATENTS

| Number | Name | Date |
|---|---|---|
| 2,259,698 | Johannessohn | Oct. 21, 1941 |

OTHER REFERENCES

Kurauti: Zeit. Physiol. Chem., 262, 53–60 (1939), 266, 11–30, 1940.

Brinks: Jour. Biol. Chem., 162, 695–706 (1946).

Wolfram: Jour. Am. Chem. Soc., 68, 724–725 (1946).